United States Patent
Hofmann et al.

(10) Patent No.: US 7,513,571 B2
(45) Date of Patent: Apr. 7, 2009

(54) SEAT ASSEMBLY FOR A MOTOR VEHICLE SEAT

(75) Inventors: Jochen Hofmann, Marktgraitz (DE); Bernhard Schrimpl, Coburg (DE); Andreas Schmid, Coburg (DE); Martin Schwarz, Coburg (DE)

(73) Assignee: Brose Fahrzeugteile GmbH & Co.KG, Coburg, Coburg (DE)

( * ) Notice: Subject to any disclaimer, the term of this patent is extended or adjusted under 35 U.S.C. 154(b) by 0 days.

(21) Appl. No.: 10/779,467

(22) Filed: Feb. 12, 2004

(65) Prior Publication Data
US 2004/0201264 A1   Oct. 14, 2004

(30) Foreign Application Priority Data
Feb. 13, 2003  (DE) ................... 103 06 541
Jan. 30, 2004  (DE) ................... 10 2004 006 051

(51) Int. Cl.
B60N 2/02 (2006.01)
G01L 3/00 (2006.01)

(52) U.S. Cl. .................... 297/344.15; 297/344.14; 297/217.2; 340/667; 73/862.325; 73/862.69

(58) Field of Classification Search ........... 297/217.2, 297/217.3, 216.19, 344.13, 344.14, 344.15; 340/666, 667; 180/217, 273; 73/862.391, 73/862.331, 862.335, 862.325, 862.69
See application file for complete search history.

(56) References Cited

U.S. PATENT DOCUMENTS

| | | | | |
|---|---|---|---|---|
| 4,979,773 A | * | 12/1990 | Eubank | 296/65.05 |
| 4,982,613 A | * | 1/1991 | Becker | 73/862.625 |
| 5,684,254 A | * | 11/1997 | Nakazaki et al. | 73/774 |
| 6,039,344 A | * | 3/2000 | Mehney et al. | 280/735 |
| 6,069,325 A | * | 5/2000 | Aoki | 177/136 |
| 6,412,357 B2 | * | 7/2002 | Billen | 73/862.637 |
| 6,571,647 B1 | * | 6/2003 | Aoki et al. | 73/862.381 |
| 6,813,966 B2 | * | 11/2004 | Dukart | 73/862.69 |
| 6,865,961 B2 | * | 3/2005 | Wolf et al. | 73/862.69 |

(Continued)

FOREIGN PATENT DOCUMENTS

DE   31 30 315 C2   2/1983

(Continued)

OTHER PUBLICATIONS

German Search Report, dated Apr. 7, 2004.

Primary Examiner—Joseph F Edell
(74) Attorney, Agent, or Firm—Christie, Parker & Hale, LLP

(57) ABSTRACT

A seat assembly includes a seat element constituting a component of the seat structure of a motor vehicle seat, a tubular drive element connected pivotably around its longitudinal axis to the seat element that constitutes a component of a displacement arrangement for an adjustable seat part, for example, for a height adjustable seat cushion, as well as a preferably electrically operated weight sensor for the detection of seat occupancy using the weight of a person sitting in the corresponding motor vehicle seat. Through the detection of seat occupancy, it is possible to control various functional groups of a motor vehicle as a function of seat occupancy, such as, for example, automatic occupancy- and/or weight-dependent adjustment of certain seat components as well as the occupancy- and/or weight-dependent deployment of an airbag module.

29 Claims, 13 Drawing Sheets

U.S. PATENT DOCUMENTS

| | | | |
|---|---|---|---|
| 6,903,280 B2 * | 6/2005 | Selig et al. | 177/144 |
| 6,986,293 B2 * | 1/2006 | Dukart | 73/862.391 |
| 7,073,391 B2 * | 7/2006 | Dukart | 73/779 |
| 2003/0067196 A1 * | 4/2003 | Sakamoto et al. | 297/217.1 |
| 2005/0046256 A1 * | 3/2005 | Yamada | 297/344.1 |

FOREIGN PATENT DOCUMENTS

| | | |
|---|---|---|
| DE | 3515126 A1 * | 10/1986 |
| DE | G 91 00 575.2 | 4/1992 |
| DE | G 94 16 933.0 | 1/1995 |
| DE | 44 06 897 C1 | 5/1995 |
| DE | 44 42 841 C2 | 6/1995 |
| DE | 196 30 325 C2 | 3/1997 |
| DE | 196 02 089 C2 | 7/1997 |
| DE | 196 23 839 C2 | 1/1998 |
| DE | 200 12 950 U1 | 12/2000 |
| DE | WO-02/102618 A1 * | 12/2002 |
| DE | 101 37 759 | 2/2003 |

* cited by examiner

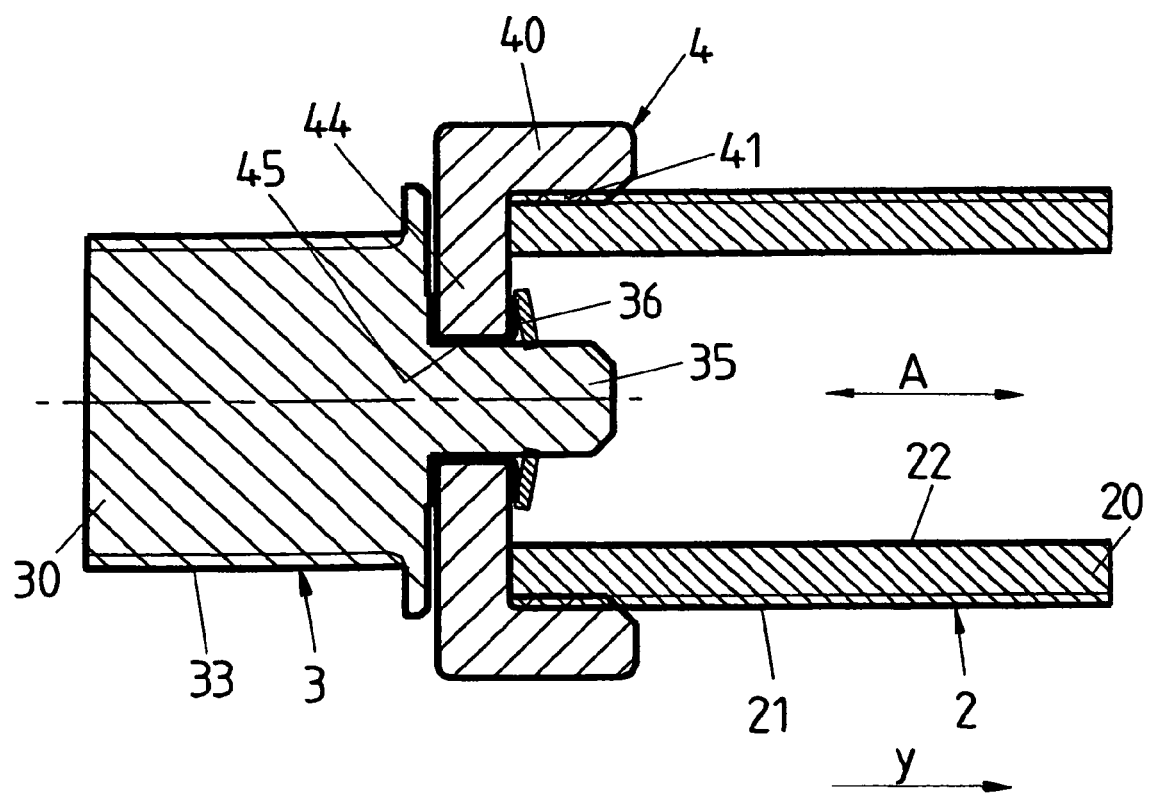

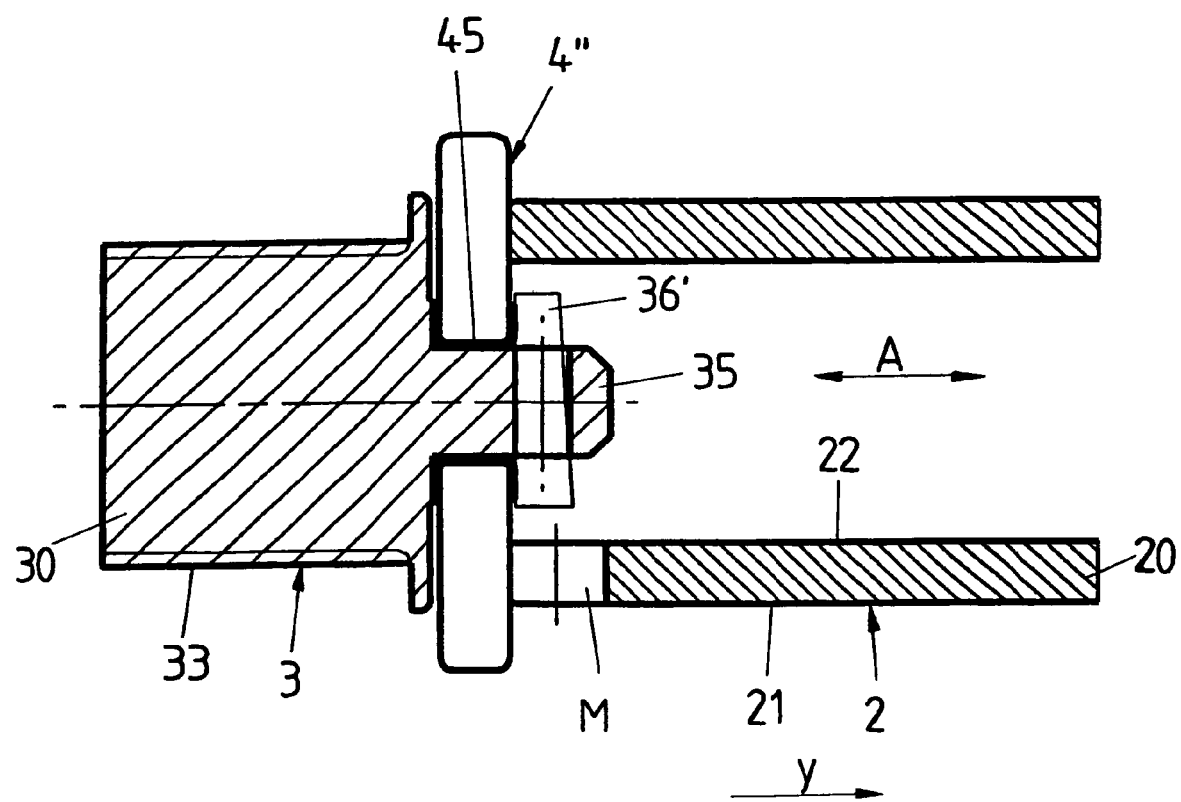

SEAT ASSEMBLY FOR A MOTOR VEHICLE SEAT

CROSS-REFERENCE TO RELATED APPLICATION(S)

This application claims priority of German Patent Application Number 103 06 541.5, filed on Feb. 13, 2003, and German Patent Application Number 10 2004 006 051.7, filed on Jan. 30, 2004.

BACKGROUND OF THE INVENTION

A seat assembly for a motor vehicle seat comprises a seat element constituting a component of a seat structure of a motor vehicle seat, a tubular drive element (drive tube) connected pivotably (around its longitudinal axis) to the seat element constituting a component of a displacement arrangement for an adjustable seat part (such as a height adjustable seat cushion), as well as a weight sensor (which in an exemplary embodiment is electrically operated) for the detection of seat occupancy using the weight of a person sitting in the corresponding motor vehicle seat. Through the detection of seat occupancy, it is possible to control various functional groups of a motor vehicle as a function of that seat occupancy such as for example, automatic occupancy- and/or weight-dependent adjustment of certain seat components as well as the occupancy- and/or weight-dependent deployment of an airbag module.

SUMMARY OF THE INVENTION

An object of the invention is to specify a new, advantageous arrangement of a weight sensor on a seat structure.

Accordingly, the tubular drive element pivotably connected with a seat element is mounted on the seat element via the weight sensor.

The solution according to the invention has the advantage that a protected arrangement of the weight sensor between the tubular drive element and the associated seat element is possible in which the sensor can extend into the tubular drive element. The solution according to the invention further enables the integration of the weight sensor into a preassembled modular unit. This results in simple assembly and ease of assembly of the seat assembly as a whole.

The term weight sensor here means any sensor that generates sensor signals as a function of the force of the weight occurring when the seat is occupied.

The seat structure comprises all structural elements of a motor vehicle seat including its subassembly, which may in some embodiments include telescoping guide rails.

In one embodiment of the invention, the tubular drive element is pivotably mounted on a mounting section of the weight sensor which extends axially into the inside of the tubular drive element or into a mounting element forming an adapter (tube adapter) nonpivotably connected to the tubular drive element. The weight sensor can be adapted to tubular drive elements of different diameters using an adapter which in a particular embodiment takes the form of an adapter bushing.

In an exemplary embodiment of the present invention, the pivotable mounting of the tubular drive element on the weight sensor occurs via a mounting element arranged on the tubular drive element which can be screwed on the inside or outside wall of the tubular drive element via suitable threads. The mounting element can also be attached thereto via any integral connection (such as that produced by welding), via a frictional connection (produced by application of pressure) or a formfitting connection. Furthermore, an integral attachment of a mounting element (serving as a tube adapter) on the tubular drive element can also occur using an adhesive, for example, by gluing the mounting element against the inside wall of the tubular drive element. The adhesive also serves to compensate or reconcile tolerances and holds the mounting element rattle-flee in the tubular drive element.

In a further embodiment, the gluing of the mounting element into the tubular drive element occurs after making a preassembled assembly from the weight sensor and the mounting element pivotably mounted thereon. To this end, the mounting element is axially retained on the mounting section of the weight sensor. For this, known locking elements such as nuts can be used. Along one direction, the axial retention can even be implemented by the main body of the weight sensor itself.

In yet another embodiment, the mounting element is designed having multiple parts wherein one part of the mounting element has a bearing area for pivotable mounting on the mounting section of the weight sensor and the other part of the mounting element has an attachment area for nonpivotable connection to the tubular drive element. The two parts of the mounting element can be nonpivotably connected to each other via a screw connection; in an exemplary embodiment the two parts of the mounting element are each designed as threaded bushings, of which one has on its inside the bearing area and on its outside a thread and the other has on its inside a thread and on its outside the attachment area for the connection to the tubular drive element. This can also be designed as a bearing bushing with the use of a one-piece mounting element.

According to one embodiment of the invention, the mounting section of the weight sensor serves as a radial bearing for the tubular drive element and has an additional support element to axially retain the tubular drive element in one direction. The support element can be attached as a separate element on the mounting section or can be formed in one piece thereon. Along the opposing axial direction, the tubular drive element can be secured against axial displacement by the main body of the weight sensor.

In a further embodiment of the invention, the mounting section of the drive weight sensor serves for both the radial and axial mounting of the tubular drive element. The mounting of the tubular drive element on the mounting section of the weight sensor can in this case be implemented using meshing threaded areas.

In an exemplary embodiment, the weight sensor is an electrically operated sensor. Using this sensor, the bending strain acting on the tubular drive element is detected upon loading of the motor vehicle seat with a motor vehicle passenger positioned thereon. The exemplary embodiment enables an arrangement of the weight sensor such that the transverse forces causing bending strain are supported under defined, reproducible conditions. To this end, the weight sensor is arranged nonpivotably (for example by means of a lock nut) on the seat element serving for the mounting of the tubular drive element.

According to an alternative embodiment, the weight sensor includes two sensor parts nonpivotably connected to each other, one of which serves to pivotably mount the tubular drive element and the other to produce a nonpivotable connection with the associated seat element. This alternative embodiment of the invention enables a particularly advantageous integration of the weight sensor into the seat assembly between the tubular drive element and the associated seat element in which flexible conditions are produced for the creation of preassembled modular units including the weight sensor.

The tubular drive element can be a drive tube for seat height displacement which is rotated adjust the seat height and which runs from one seat side to the other seat side as a transverse tube at a right angle to the longitudinal seat direction.

The seat element serving to mount the drive tube can be a seat side part or a guide rail for longitudinal displacement of the seat or a mounting angle attached thereon.

Additional characteristics and advantages of the invention will become clear with the following description of exemplary embodiments with reference to the figures.

BRIEF DESCRIPTION OF THE DRAWINGS

FIG. 1a shows a first exemplary embodiment of a weight sensor preassembled on a drive tube, through which weight sensor the drive tube can be pivotably mounted on a seat part;

FIG. 4 shows an alternative to the embodiment of FIGS. 1a and 2a concerning the pivotable mounting of the drive tube on the weight sensor and the axial retention of the drive tube relative to the weight sensor;

DETAILED DESCRIPTION OF THE INVENTION

Figure 9:
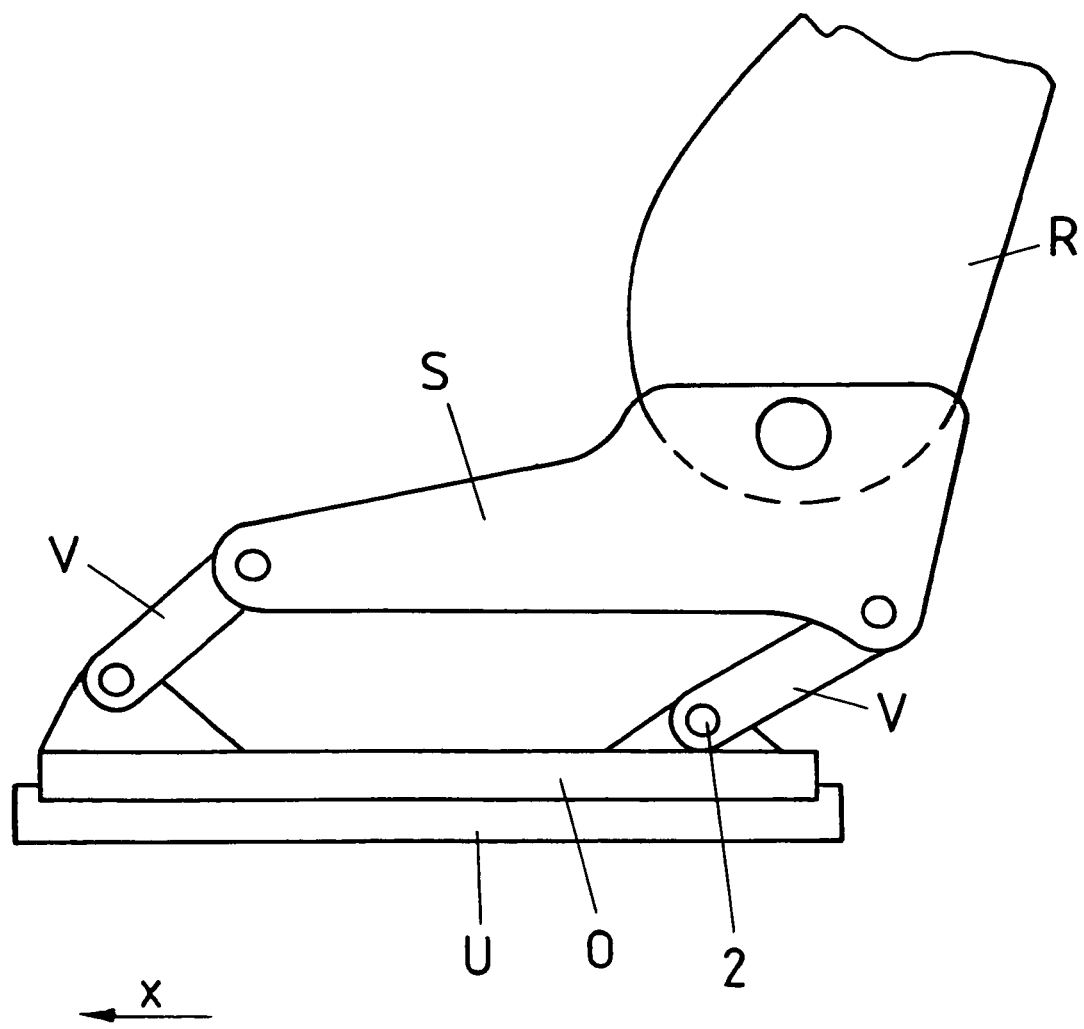
FIG. 9 shows a schematic side view of a motor vehicle seat.

FIG. 9 schematically depicts a motor vehicle seat, the seat structure of which comprises two seat side parts S arranged on the two longitudinal sides of the motor vehicle seat S (only one of which is discernible in the side view according to FIG. 9). FIG. 9 also depicts a seat back R tiltably connected to the two seat side parts S. The seat side parts S serve to accommodate a seat bucket, on which a seat cushion providing a seating surface for a motor vehicle passenger is arranged. The seat side parts S are each hingedly connected via front and rear adjusting levers V with a longitudinal seat guide that comprises a first guide rail, subrail U fixedly arranged on a car body as well as a seat side guide rail displaceable relative to the rail fixed to the car body, upper rail O.

For adjustment of the seat height (which comprises in the embodiment shown the vertical distance of the seating surface from the longitudinal seat guide), the two adjusting levers V are hinged. One of the adjusting levers is associated with an adjustment drive and the other adjusting lever is a passive adjustment lever which merely reproduces the hinged movement induced by the first adjusting lever.

In the exemplary embodiment of a seat structure depicted in FIG. 9, a drive tube 2 associated with the rear adjusting lever V forms the lower axis about which the adjusting lever V is rotatably hinged to the upper rail O of the longitudinal seat guide. The drive tube 2 is a transverse tube that runs from the rear adjusting lever V on one longitudinal side of the motor vehicle seat at a right angle to the longitudinal seat direction x to the corresponding rear adjusting lever of the seat side part arranged on the other longitudinal side of the motor vehicle seat. In alternative embodiments, the seat direction x comprises either the longitudinal axis of the vehicle, or longitudinal direction of the rails.

Weight sensors are known that detect the occupancy of a known motor vehicle seat by a motor vehicle passenger. The sensors operate by using the difference in weight between an occupied and an unoccupied seat and, optionally, the weight of the user of the seat as well as by determining the position and size of the user of the seat by determining a fictitious center of gravity. As a function of the occupancy of the seat, it is possible, for example, to control the longitudinal displacement of the seat by means of guide rails O, U or an air bag module associated with the motor vehicle seat.

FIG. 1a depicts a first exemplary embodiment the invention having a weight sensor 3 in a motor vehicle seat of the type depicted in FIG. 9. Accordingly, the weight sensor 3 constitutes an assembly that can be preassembled together with the drive tube 2 and in which the drive tube 2 is pivotably mounted on the weight sensor 3. The weight sensor 3 is an electrically operated sensor the function of which will be presented in greater detail below with reference to FIG. 3. The weight sensor 3 has a main body 30 provided with an external thread 33. The sensor components necessary to generate a weight-dependent sensor signal as well as a journal 35 spaced at a distance from the main body 30 in the axial direction A (longitudinal direction of the drive tube 2) are arranged in the main body 30. The journal 35 extends into the inside of the drive tube 2.

A mounting element 4 in the form of a bearing bushing with a thread 41 is screwed on the threaded exterior of the wall 20 of the drive tube 2. This mounting element 4 has a mounting section 44 running from the end of the drive tube 2 facing the sensor 3 all the way to the journal 35 of the weight sensor 3, spaced at a distance from its main body 40 such that the drive tube 2 is mounted radially via the mounting element 4 pivotably on the journal 35 of the weight sensor 3.

The main body 30 of the sensor 3 (which is arranged in front of one end of the drive tube 2 outside the drive tube) serves to axially retain the drive tube 3 on the journal 35 of the weight sensor 3, as does an axial locking element 36 arranged on the journal 35 (for example in the form of a clamping ring). Thus, the mounting section 44 of the mounting element 4 attached to the drive tube 2 is fixed axially and substantially immobile between the main body 30 and the axial locking element 36 of the weight sensor 3.

Thus, the weight sensor 3 and the drive tube 2 constitute an assembly that can be preassembled and which features a simple construction as well as an ease of installation on a corresponding seat element. In comparison, consider the discussion regarding FIG. 3 below.

Figure 1B:
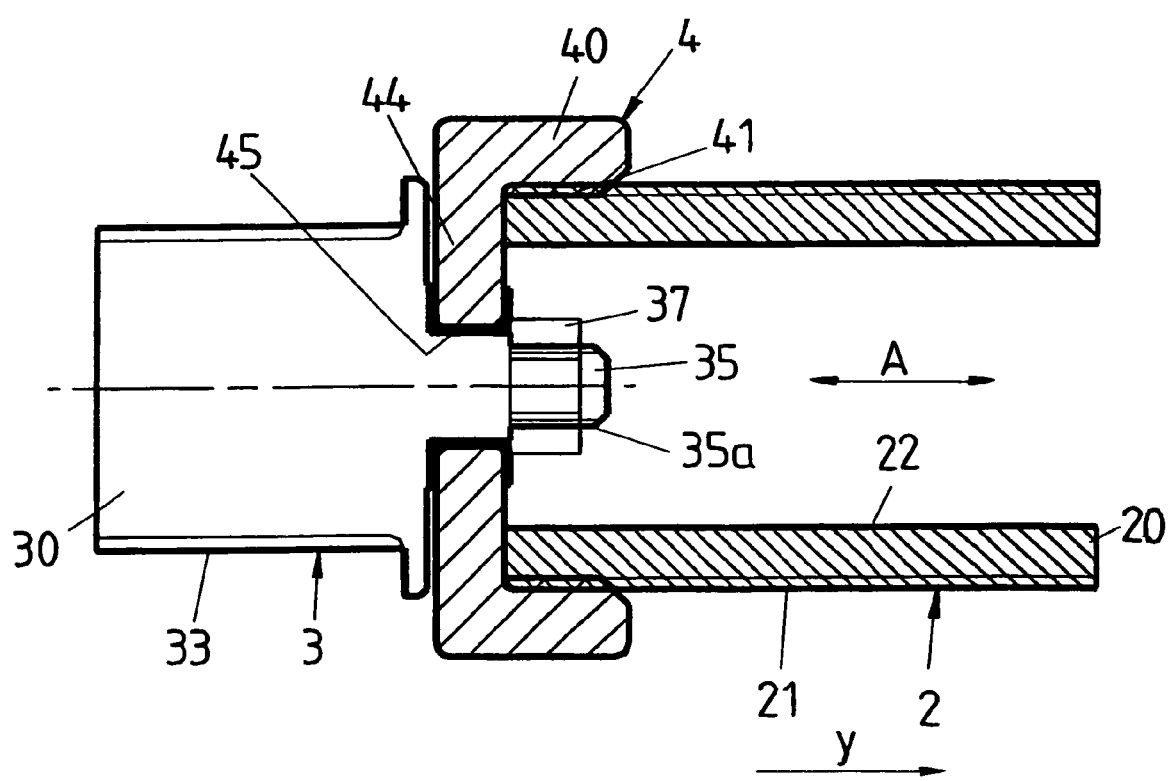
FIG. 1b shows an alternative to the embodiment of FIG. 1a concerning the axial retention of the drive tube relative to the weight sensor.

FIG. 1b depicts an alternative embodiment to that shown in FIG. 1a, in which the journal 35 of the weight sensor 3 has an external thread 35a on which a nut is screwed as an axial locking element 37. This is provided as an alternative to the clamping ring 36 of FIG. 1a.

Figure 1C:
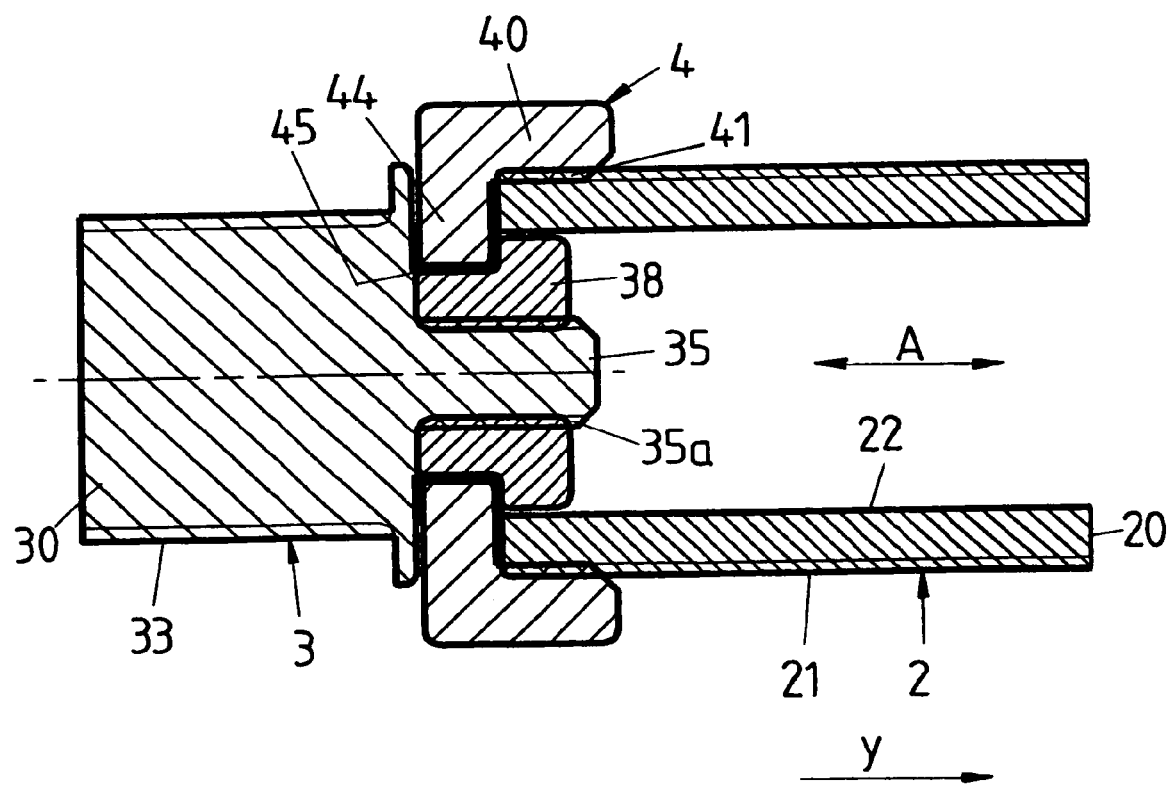
FIG. 1c shows another alternative to the embodiment of FIG. 1a concerning the axial retention of the drive tube relative to the weight sensor.

In the exemplary embodiment depicted in FIG. 1c, an adapter in the form of an adapter bushing 38 is screwed onto the external thread 35a of the journal 35 of the weight sensor 3. The adapter forms a radial bearing for the drive tube 2 by defining together with the mounting element 4 of the drive tube 2 a radial bearing 45. The adapter also serves (together with the main body 30 of the weight sensor 3) to axially retain the drive tube 2 relative to weight sensor 3.

The adapter bushing 38 enables adaptation of the journal 35 to drive tubes 2 of different diameters or to differently designed mounting elements 4.

Figure 2A:
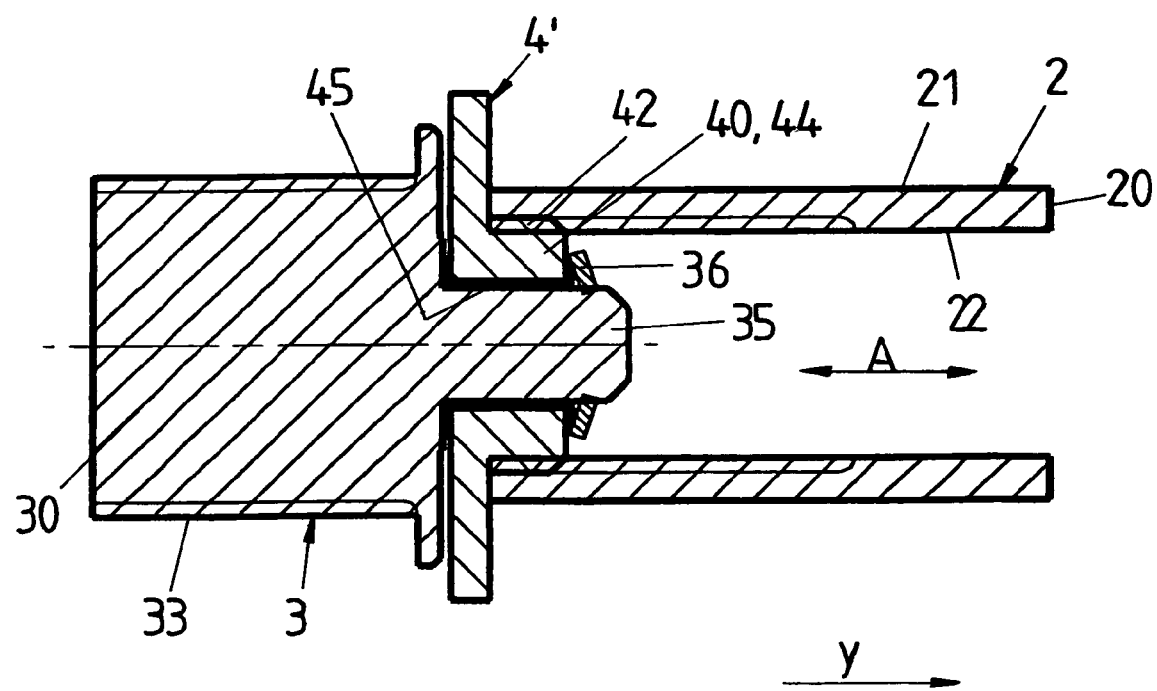
FIG. 2a shows an alternative to the embodiment of FIG. 1a concerning the pivotable mounting of the drive tube on the weight sensor.

FIG. 2a shows an alternative to the embodiment of FIG. 1a regarding the attachment of the mounting element 4' in the form of a bearing bushing on the drive tube 2. According to FIG. 2a, the bearing bushing 4' having an external thread 42 is screwed into the inside wall 22 of the drive tube 2 which is provided with an internal thread. The mounting section 44 of the bearing bushing 4' is thus formed by the main body 40 provided with the thread 42. An axial locking element 36 in the form of a clamping ring serves here, as in the exemplary embodiment of FIG. 1a, to axially retain the drive tube 2 mounted on the journal 35 of the weight sensor 3 via the radial bearing 45.

Figure 2B:
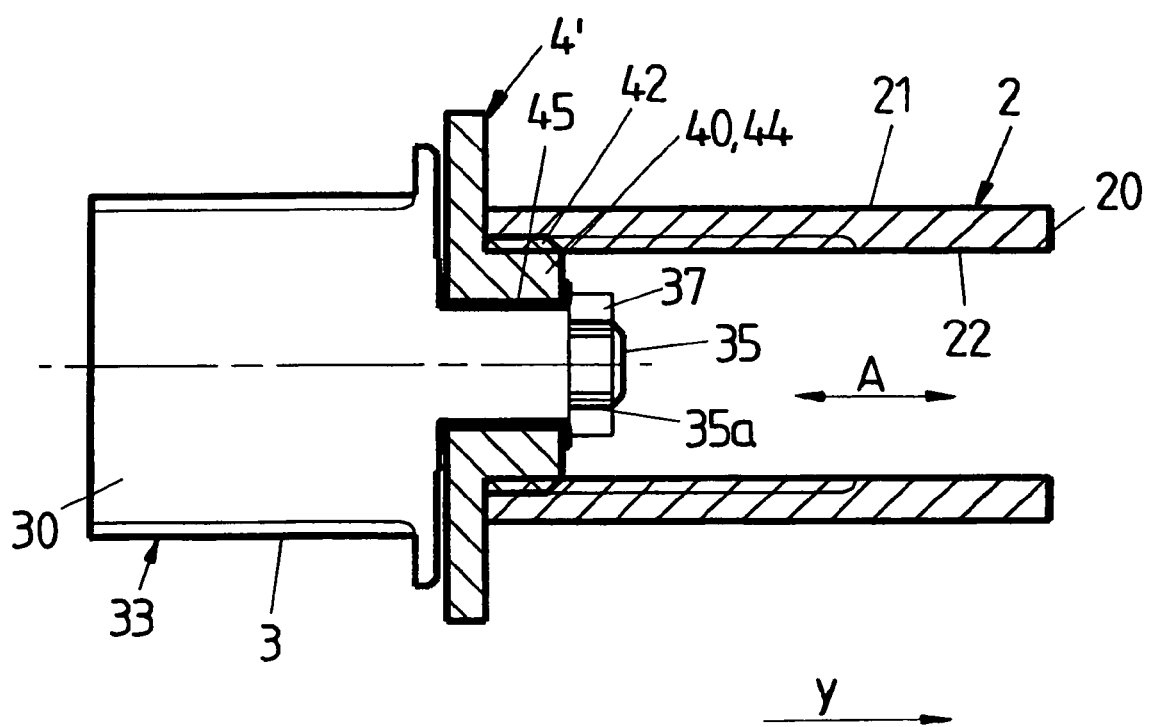
FIG. 2b shows an alternative to the embodiment of FIG. 2a concerning the axial retention of the drive tube relative to the weight sensor.

FIG. 2b depicts a variant of the arrangement of FIG. 2a, in which the axial locking element 37 is formed by a nut screwed onto an external thread 35a of the journal 35.

Figure 2C:
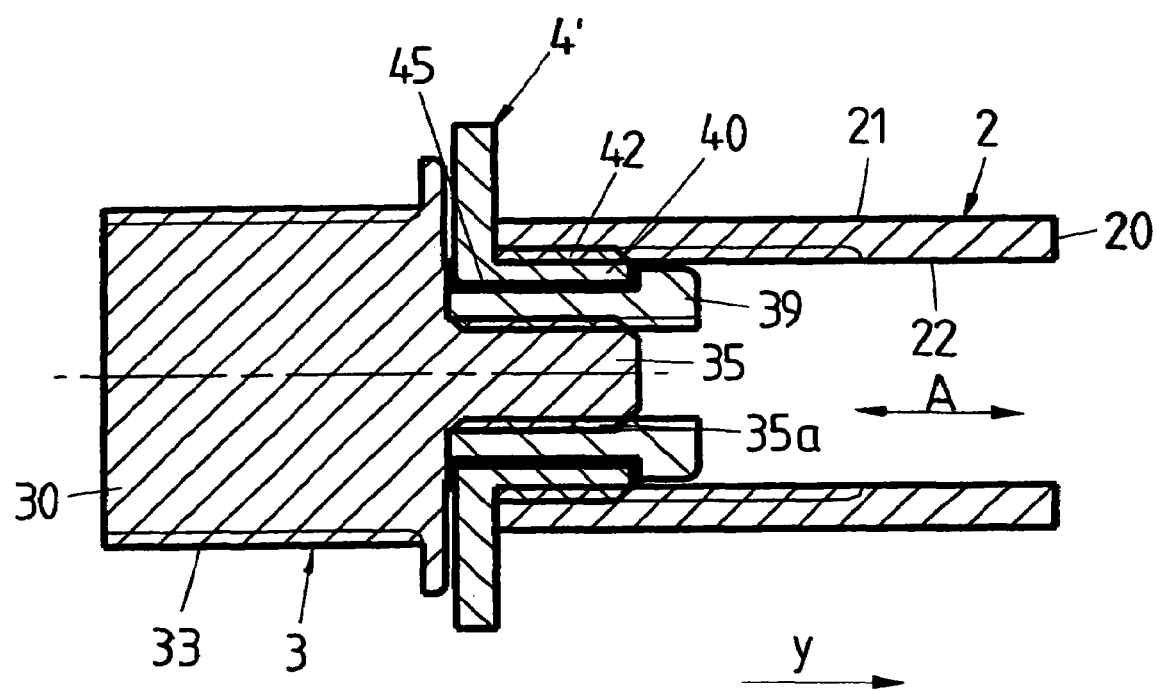
FIG. 2c shows another alternative to the embodiment of FIG. 2a concerning the axial retention of the drive tube relative to the weight sensor.

FIG. 2c depicts an alternative to the embodiment shown in FIG. 2a in which a weight sensor 3 having an adapter bushing 39 screwed onto the external thread 35a of the journal 35. The journal 35 forms (according to the embodiment shown in FIG. 1e) a radial bearing 45 together with the bearing bushing 4' and serves to axially retain the drive tube 2 relative to the weight sensor 3.

The screwing of a bearing bushing 4' with a thread into the inside wall 22 of the drive tube 2 depicted in FIGS. 2a through 2c is particularly suited for drive tubes with large diameters, or for those applications in which no space is available for attachment of the mounting element on the outside wall 21 of the drive tube 2.

Figure 3:
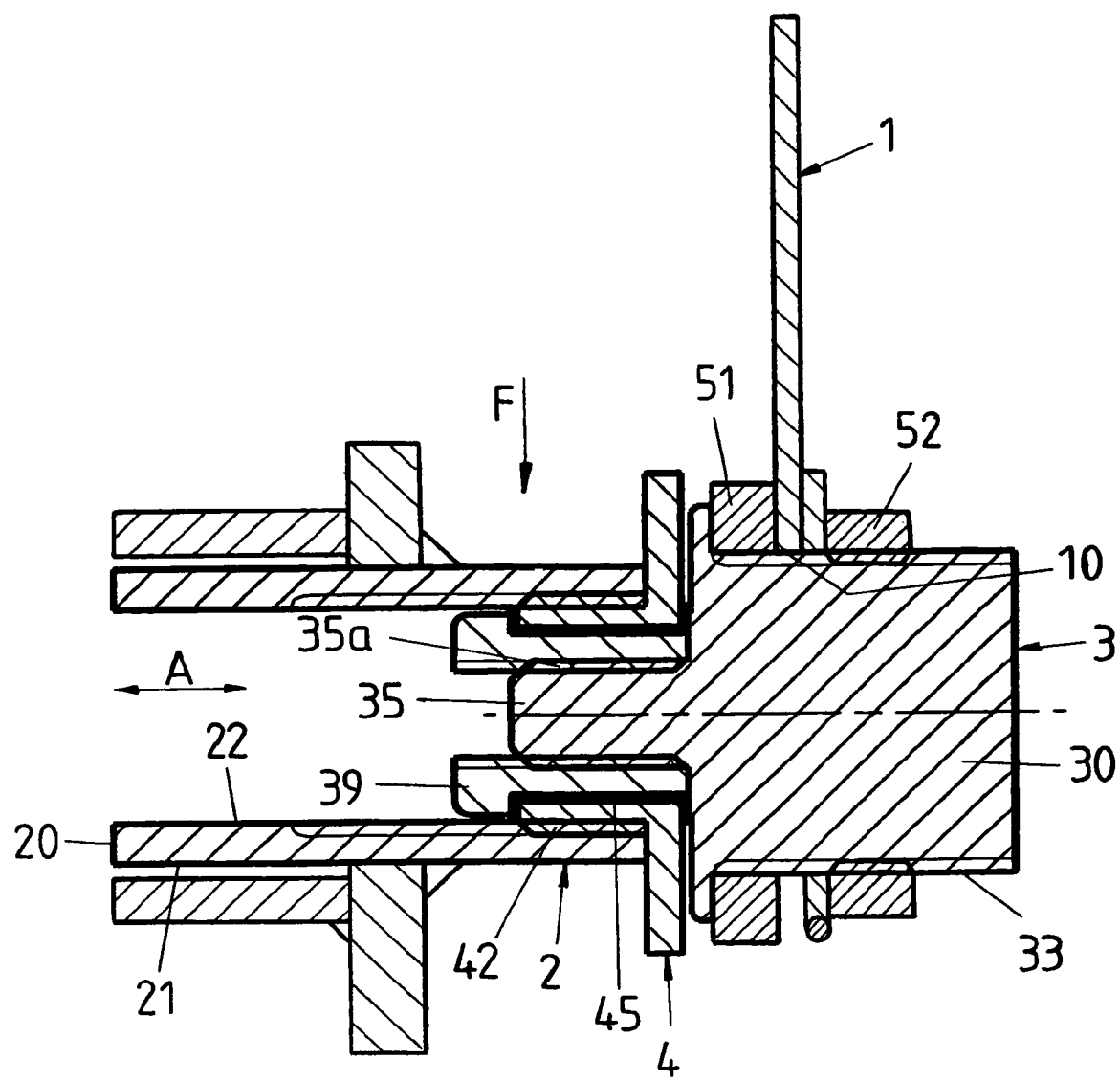
FIG. 3 shows the embodiment of FIG. 2c together with a seat element, on which the drive tube is pivotably mounted via the weight sensor.

FIG. 3 depicts a preassembled modular unit having the drive tube 2 and the weight sensor 3 shown after incorporation into a motor vehicle seat accomplished by attachment on a mounting angle 1 of the corresponding seat structure. The weight sensor 3 penetrates with its main body through an opening 10 of the mounting angle 1 substantially without play and is attached on the mounting angle 1 by means of a nut 51 as well as an associated lock nut 52. The nut 51 and associated lock nut 52 are screwed on the two sides of the mounting angle 2 on the external thread 33 of the main body 30 of the weight sensor 3.

In this case, the weight sensor 3 is nonpivotably attached on the mounting angle 1 and also serves to pivotably mount the drive tube 2 on the journal 35. Accordingly, the drive tube 2 is pivotably connected via the weight sensor 3 to the seat element 1 in the form of a mounting angle. The weight sensor 3 additionally assumes the necessary function pivotably mounting the drive tube 2 on the mounting angle 1. In addition to enabling preassembly of the weight sensor 3 with the drive tube 2 (with the main body 30 of the weight sensor 3 provided with an external thread 33 forming a defined interface with the associated seat element (mounting angle 1)) as well as the simple structure of the overall arrangement, the protected mounting of the weight sensor 3—partially in the inside of the drive tube 2 and partially surrounded by the mounting angle 1 as well as the associated lock nut 51, 52—is, above all, advantageous.

In addition, this arrangement ensures that the forces of weight occurring with occupancy of the corresponding motor vehicle seat, which act as transverse forces F on the drive tube 2, are always detected in the same manner by the sensor 3. This is attributed to the defined support of the sensor 3 with its main body 30 against the edge of the opening 10 of the mounting angle I damped between the two nuts 51 and 52. Thus, a bending of the drive tube 2 resulting from the transverse forces F generated by seat occupancy that is detected by the sensor 3 via the journal 35 extending into the drive tube can be reproducibly determined and evaluated, such that erroneous deployments are reliably avoided.

FIG. 4 depicts an alternative to the embodiments of the preassembled modular units depicted in FIGS. 1a through 1c and 2a through 2c concerning the attachment of the mounting element 4" on the drive tube 2. According to FIG. 4, the mounting element 4" is attached on one end of the drive tube 2 (by welding in an exemplary embodiment). The radial bearing 45, through which the drive tube 2 is mounted on the journal 35 of the weight sensor 3 lies outside the interior of the actual drive tube 2. To axially retain the drive tube 2 relative to weight sensor 3, a locking element in the form of a wedge 36' is pressed into a radial bore of the journal 35 extending into the inside of the drive tube 2. For this, a corresponding assembly opening M is provided in the wall 20 of the drive tube 2.

Figure 5A:
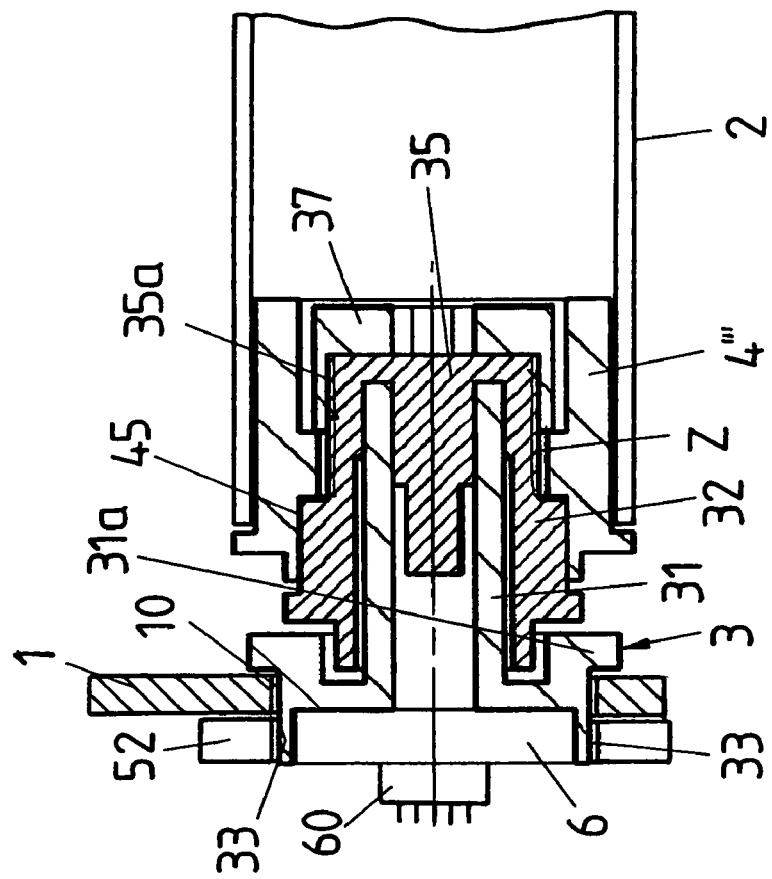
FIG. 5a shows a drive tube pivotably mounted on a side part of a seat via a two-part weight sensor.

In the modular unit depicted in FIG. 5a, the weight sensor 3 is made up of two sensor parts 31 and 32 nonpivotably connected to each other, of which the sensor part 31 serves to nonpivotably connect the weight sensor 3 to a mounting angle 1 of the seat structure and the sensor part 32 serves to pivotably mount the drive tube 2 on the weight sensor 3.

The first sensor part 31 penetrates an opening 10 of the mounting angle 1 and lies against the edge of the opening with an angled protrusion 31a. On the other side of the opening 10, a lock nut 51 is screwed onto an external thread 33 of the first sensor part 31 such that the mounting angle 1 is firmly clamped between the radially outward projecting protrusion 31a of the first sensor part 31 and the lock nut 51. Thus, the first sensor part 31 is fixed nonpivotably on the mounting angle 1. An electronic assembly 6, as well as an electric plug connector 60 of the weight sensor 3 are further arranged on the first sensor part 31, such that the sensor 3 is supplied with electrical energy via the first sensor part 31 and can output sensor signals through it.

The second sensor part 32 has a journal 35 extending into the inside of the drive tube 2 which, with a mounting element 4''' nonpivotably arranged on the inside wall of the drive tube 2, forms a radial bearing 45 for the pivotable mounting of the drive tube 2 on the weight sensor 3. To axially retain the drive tube 2 relative to the weight sensor 3, the mounting element 4''' is supported on the main body of the second sensor part 32 as well as (in the interior of the drive tube 2) on a locking element 37 in the form of a nut screwed onto an external thread 35a of the journal 35.

To prevent excess rigidity in the mounting of the drive tube 2 via the mounting element 4''' on the journal 35a, the mounting element 4''' and the journal 35 are spaced at a distance from each other in the radial direction outside the radial bearing 45. A gap Z is thus present in each case in the radial direction to provide bearing clearance.

Figure 5B:
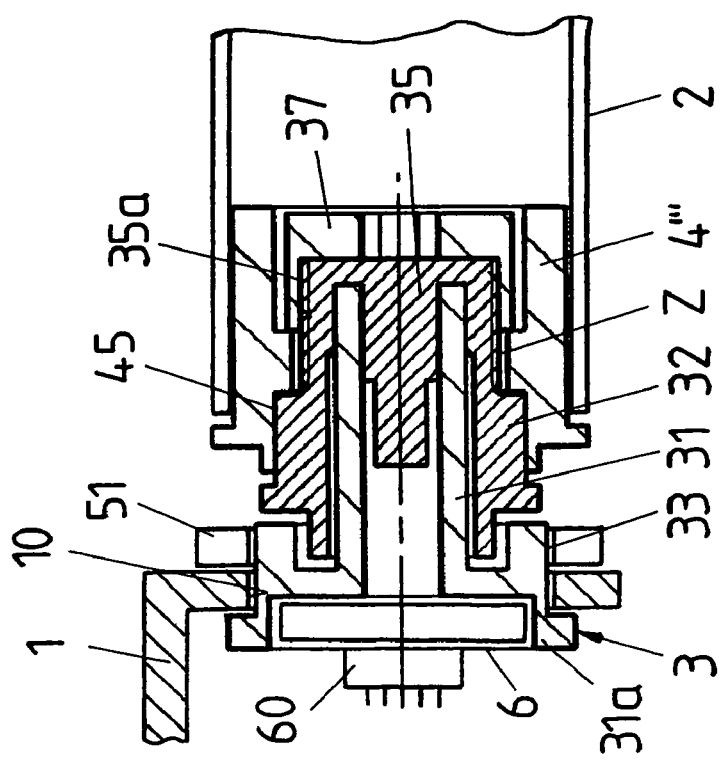
FIG. 5b shows an alternative to the embodiment of FIG. 5a concerning the attachment of the weight sensor on the side part of the seat.

FIG. 5b depicts an alternative embodiment to that shown in FIG. 5a, in which the first sensor part 31 is supported on a radially outward projecting protrusion 31a on the end of the edge of the opening 10 in the mounting angle 1 facing the drive tube 2, and the associated lock nut 52 is located on the end of the edge of the opening 10 facing away from the drive tube 2. The arrangement of the radial protrusion 31a and the associated lock nut is thus precisely reversed relative to the exemplary embodiment depicted in FIG. 5a. This enables complete preassembly of the assembly including the drive tube 2 and the two sensor parts 31 and 32. The assembly is then introduced into the opening 10 of the mounting element 1 such that the first sensor part 31 with its section having an external thread 33 penetrates the opening 10 and lies with its radially projecting protrusion 31a against the edge of the opening. The position of the weight sensor 3 is then secured by screwing the lock nut 52 on the external thread 33 of the first sensor part 31.

Figure 6:
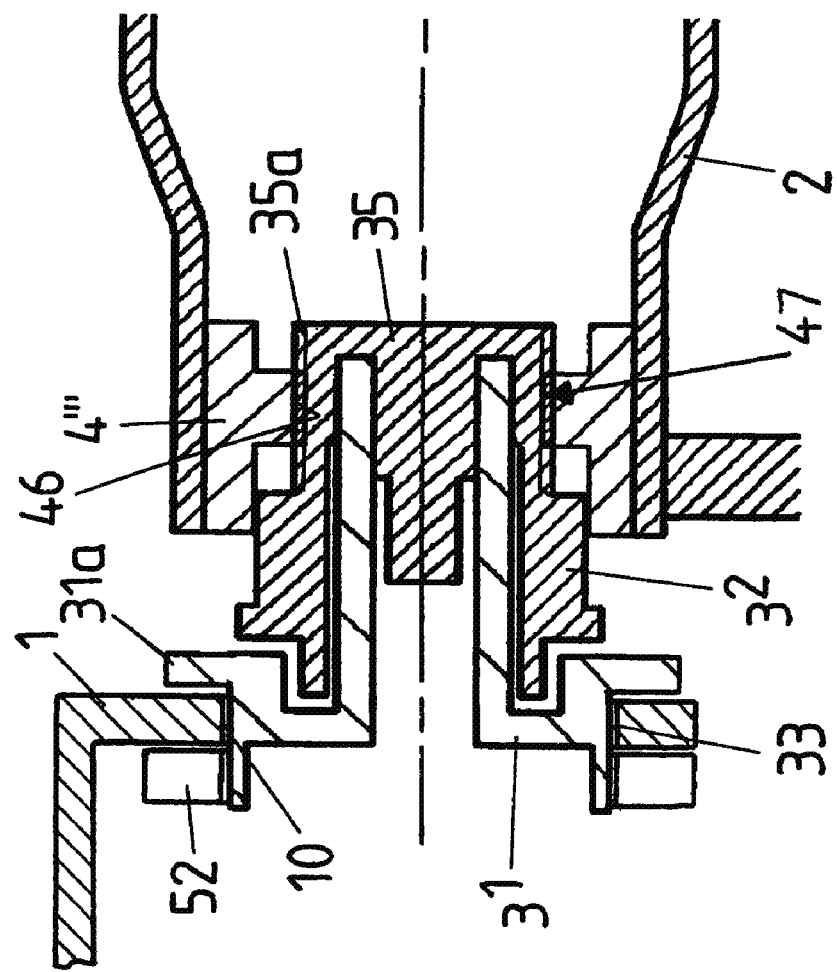
FIG. 6 shows an alternative to the exemplary embodiment of FIG. 5b concerning the pivotable mounting of the drive tube on the weight sensor.

FIG. 6 depicts an alternative to the embodiments shown in FIGS. 5a and 5b in which coordinated threaded areas 35a and 46 of the journal 35 and the mounting elements 4''', respectively, serve to mount the mounting element 4''' molded with the drive tube 2 on the journal 35 of the second sensor part 32. Thus, the bearing itself directly takes over the necessary axial retention of the drive tube relative to weight sensor 3 without the need for additional, separate axial locking elements.

However, forming the bearing by meshing threaded areas 47 by rotation of the drive tube 2 results in a relative movement of drive tube 2 and thread weight sensor 3 along the tube axis A (corresponding to the transverse axis of the vehicle y). The extent of this movement depends on the pitch of the meshing threads 35a and 46. This movement can be compensated for by play provided in the arrangement as well as the ever-present elasticities.

Figure 7:
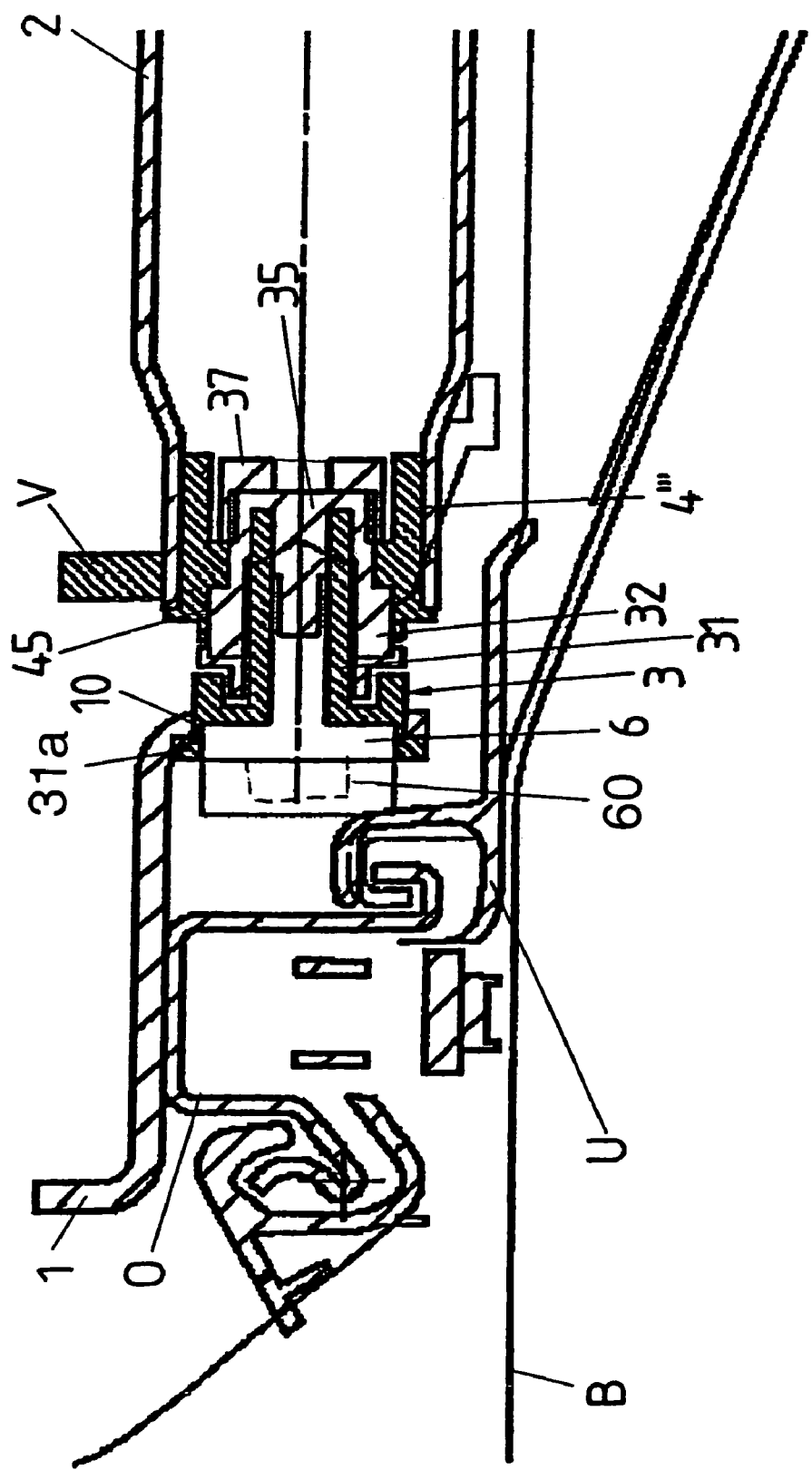
FIG. 7 shows the embodiment of FIG. 5a together with additional seat components.

FIG. 7 depicts the embodiment shown in FIG. 5a together with additional seat structure components, namely a subrail U fixed on the motor vehicle floor B, as well as an upper rail O guided and longitudinally displaceable on the subrail U. The upper rail O is attached on the mounting angle 1 that serves as the pivotable mounting of the drive tube 2 via the weight sensor 3. In FIG. 7, an adjusting lever V (cf. FIG. 9) is shown nonpivotably connected to the drive tube 2. The adjusting lever V serves to adjust the seat height.

With reference to FIG. 7 the weight sensor 3 is shown positioned partially inside the drive tube 2 as well as partially covered by the mounting angle 1 and protected laterally by the guides O and U.

Figure 8:
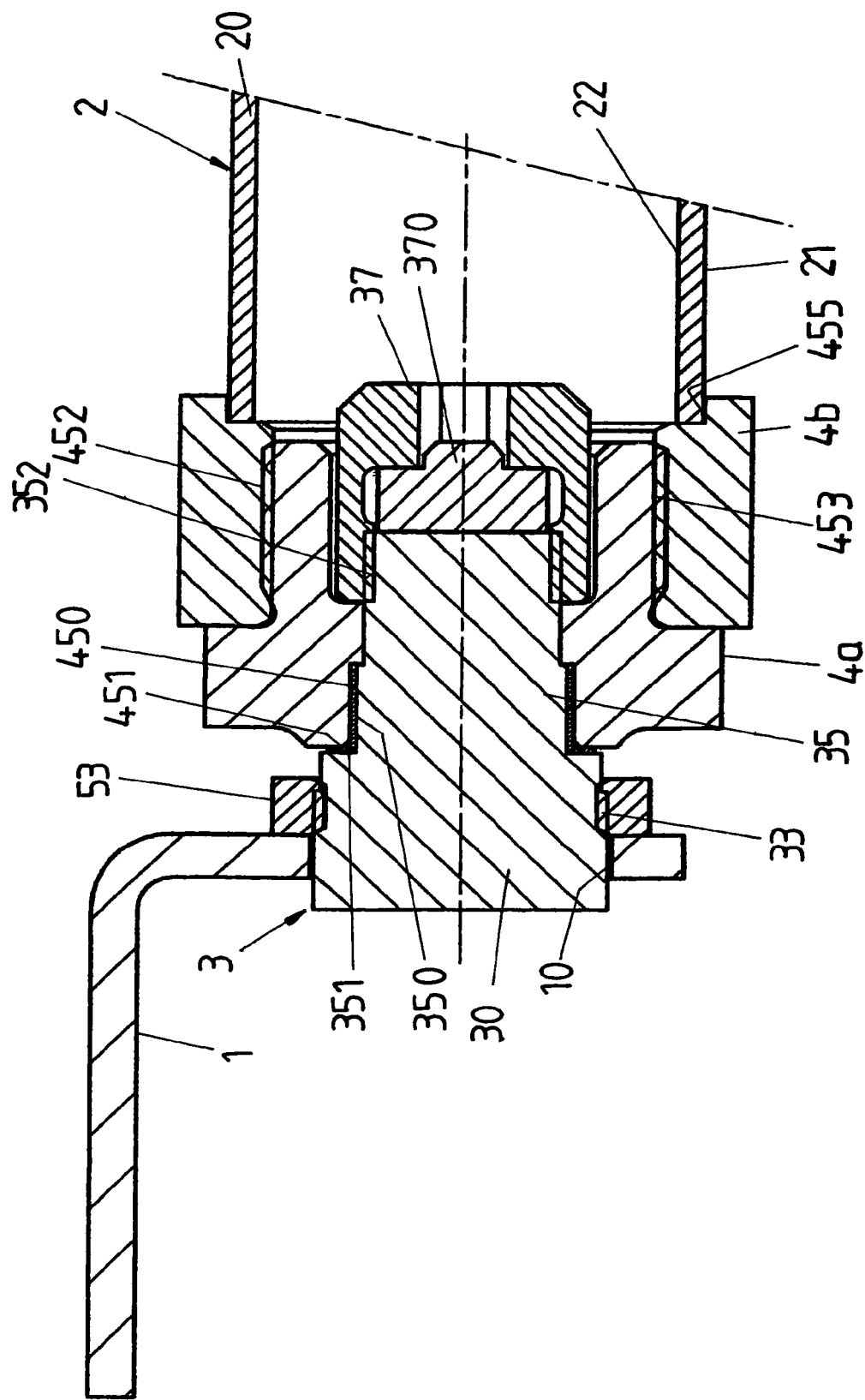
FIG. 8 shows another exemplary embodiment of a weight sensor assembled on a drive tube, through which weight sensor the drive tube can be pivotably mounted on a seat part.

In the particularly easy to assemble exemplary embodiment depicted in FIG. 8, the main body 30 of the weight sensor 3 is attached to a mounting angle 1 which can serve to secure the weight sensor on a guide rail of a longitudinal seat guide of a motor vehicle seat. The main body 30 of the weight sensor extends substantially without play into an opening 10 of the mounting angle 1 and is fixed thereon by means of at least one nut 53 screwed onto an external thread 33 of the main body 30 of the weight sensor 3.

The weight sensor 3 has a mounting section 35a stepped in one piece from the main body 30, which forms two circumferential bearing surfaces 350 and 351 oriented at right angles to each other and connecting directly with each other, and on which a bearing bushing 4a provided with an external thread 452 is pivotably mounted by means of corresponding circumferential bearing surfaces 450 and 451 oriented at right angles to each other.

The bearing bushing 4a is secured on the mounting section 35 of the weight sensor 3 in the axial direction. It is supported axially via its angled bearing surface 451 against the associated angled bearing surface 351 of the weight sensor 3. It is secured in the opposite direction against axial slippage by means of a lock nut 37 screwed on to an external thread 352 of the weight sensor 3.

The bearing surfaces 350, 351, 450 and 451, as well as the axial retention or mounting of the bearing bushing 4a by means of the associated lock nut 37, can optionally be supplemented and improved in their efficiency by additional plain bearings and/or axial disks. Furthermore, the bearing areas can be designed with angular movement to keep disrupting influences (such as for example tolerances or angular movements of the structure) away from the weight sensor 3. To set a predefined axial play between weight sensor 3 and bearing bushing 4a, the lock nut 37 is firmly screwed onto the weight sensor 3 up to a defined axial stop. For production engineering reasons, it may be necessary to use a spacing element 370 to bridge the thread runout in the lock nut 37.

Because of the axial retention of the bearing bushing 4a provided with an external thread 452 on the mounting section 35 of the weight sensor 30 between its angled bearing surface 351 and the lock nut 37, the weight sensor 3 can be combined with the bearing bushing 4a into a preassembled assembly onto which the drive tube 2 (in the form of a transverse shaft) is subsequently attached.

For this combination, a threaded bushing 4b is attached (for example by welding) in the region of the front end of the main body 20 of the drive tube 2, and provided with an internal thread 453 running along the end facing the weight sensor 3 with an attachment section 455 as well as along a part of the outside wall 21 of the drive tube 2. By screwing this threaded bushing 4b with its internal thread 453 onto the external thread 452 of the bearing bushing 4a, a nonpivotable connection is produced between drive tube 2 and bearing bushing 4a. The drive tube 2 is mounted via the threaded bushing 4b and the bearing bushing 4a is pivotably mounted on the bearing surfaces 350 and 351 of the mounting section 35 of the weight sensor 3.

In an exemplary embodiment, the drive tube 2 and the threaded bushing 4b can be designed in one piece with a thread 453 cut directly into the drive tube 2.

In an embodiment alternative to the above-described welded connections between the drive tube 2 and a respective mounting element via which the drive tube 2 is mounted on the mounting section 35 of the weight sensor 3, a mounting element (which can be optionally preassembled on the mounting section 35 of the weight sensor 3) can also be attached by gluing on the drive tube 2. In a further embodiment, the mounting element can be attached by an adhesive connection with the inside wall 22 of the drive tube 2. The adhesive also serves to compensate or reconcile tolerances on the inside of the drive tube 2 and holds the mounting element serving as an adapter rattle-free in the drive tube 2.

The invention claimed is:

1. A seat assembly for a motor vehicle seat, comprising:
   a seat element comprising a component of a seat structure of a motor vehicle seat;
   an at least partially hollow cylindrical drive element pivotably connected to the seat element, the drive element comprising a component of a displacement arrangement for an adjustable part of the motor vehicle seat; and
   a weight sensor for detecting at least one of seat occupancy and the weight of a seat user;
   wherein the drive element is mounted on the seat element via the weight sensor.

2. The seat assembly of claim 1, wherein the drive element is pivotably mounted on a mounting section of the weight sensor.

3. The seat assembly of claim 2, wherein the mounting section serves for the radial mounting of the drive element.

4. The seat assembly of claim 3, wherein a locking element for the axial retention of the drive element is arranged on the mounting section.

5. The seat assembly of claim 2, wherein the mounting section extends axially inside at least one of the drive element and an element nonpivotably connected thereto.

6. The seat assembly of claim 5, wherein the mounting section serves for the radial and axial mounting of the drive element.

7. The seat assembly of claim 6, wherein toothed zones mesh with each other for the mounting of the drive element on the mounting section.

8. The seat assembly of claim 2 or 5, wherein the mounting section is provided with an adapter.

9. The seat assembly of claim 8, wherein the adapter is an adapter bushing.

10. The seat assembly of claim 1, wherein a mounting element is arranged on the drive element, and wherein the drive element is pivotably mounted on the weight sensor through the mounting element.

11. The seat assembly of claim 10, wherein the mounting element is attached by using a screw connection on at least one of the inside and outside wall of the drive element.

12. The seat assembly of claim 10, wherein the mounting element is connected to the drive element by at least one of welding and gluing.

13. The seat assembly of any one of claims 10 through 12, wherein the mounting element is designed with multiple parts, with one part serving for the pivotable mounting of the drive element on the weight sensor and the other part serving for the nonpivotable connection of the mounting element to the drive element.

14. The seat assembly of claim 13, wherein the two parts of the mounting element are formed by threaded bushings that can be screwed together, one of which has an external thread and the other an internal thread.

15. The seat assembly of claim 10, wherein the mounting element can be preassembled on the weight sensor using an axial locking element before the mounting element is nonpivotably connected to the drive element.

16. The seat assembly of claim 1, wherein the drive element is axially secured in one direction by the main body of the weight sensor.

17. The seat assembly of claim 1, wherein the weight sensor is designed as an electrically operated sensor.

18. The seat assembly of claim 1, wherein the weight sensor is designed for the detection of bending stresses.

19. The seat assembly of claim 1, wherein the weight sensor is arranged nonpivotably on the seat element.

20. The seat assembly of claim 19, wherein at least one lock nut serves for the nonpivotable arrangement of the weight sensor on the seat element.

21. The seat assembly of claim 19, wherein a sensor part is nonpivotably fixed to the seat element.

22. The seat assembly of claim 1, wherein the weight sensor is designed in two parts.

23. The seat assembly of claim 22, wherein the two parts of the weight sensor are nonpivotably connected to each other.

24. The seat assembly of claim 22 or 23, wherein the weight sensor has a mounting section for the pivotable mounting of the drive element; and
wherein the drive element is pivotably mounted on the mounting section of the weight sensor.

25. The seat assembly of claim 1, wherein the drive element and the weight sensor comprise a preassembled assembly that can be attached to the seat element.

26. The seat assembly of claim 1, wherein the drive element comprises a transverse tube, that runs, in particular, from one longitudinal side of a motor vehicle seat to the other.

27. The seat assembly of claim 1, wherein the seat element is made up of a mounting angle that is attached to a part of the seat structure.

28. The seat assembly of claim 1, wherein the weight sensor is configured to detect seat occupancy and the weight of a seat user.

29. The seat assembly of claim 1, wherein the drive element comprises a transverse tube that is a component of a transverse connection running from one longitudinal side of a motor vehicle seat to the other.

* * * * *